(12) United States Patent
Morita

(10) Patent No.: US 10,870,050 B2
(45) Date of Patent: Dec. 22, 2020

(54) INPUT DEVICE

(71) Applicant: Sony Interactive Entertainment Inc., Tokyo (JP)

(72) Inventor: Masaho Morita, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/445,326

(22) Filed: Jun. 19, 2019

(65) Prior Publication Data

US 2019/0388779 A1    Dec. 26, 2019

(30) Foreign Application Priority Data

Jun. 21, 2018 (JP) ................... 2018-117876

(51) Int. Cl.
| | |
|---|---|
| *A63F 13/214* | (2014.01) |
| *A63F 13/22* | (2014.01) |
| *G06F 3/0354* | (2013.01) |
| *G06F 3/0338* | (2013.01) |
| *A63F 13/24* | (2014.01) |

(52) U.S. Cl.
CPC ............ *A63F 13/214* (2014.09); *A63F 13/22* (2014.09); *A63F 13/24* (2014.09); *G06F 3/0338* (2013.01); *G06F 3/03547* (2013.01)

(58) Field of Classification Search
USPC .......................................................... 463/38
See application file for complete search history.

(56) References Cited

U.S. PATENT DOCUMENTS

| | | | |
|---|---|---|---|
| 6,186,896 B1* | 2/2001 | Takeda ............... | A63F 13/02 463/38 |
| 7,314,413 B2* | 1/2008 | Ogata ................. | A63F 13/06 463/37 |
| 7,499,040 B2 | 3/2009 | Zadesky | |
| 9,690,392 B2 | 6/2017 | Igarashi | |
| 9,789,395 B2 | 10/2017 | Igarashi | |
| 2005/0052425 A1 | 3/2005 | Zadesky | |
| 2015/0193017 A1 | 7/2015 | Igarashi | |
| 2015/0290534 A1 | 10/2015 | Igarashi | |

FOREIGN PATENT DOCUMENTS

| | | |
|---|---|---|
| JP | 2003067128 A | 3/2003 |
| JP | 2006018727 A | 1/2006 |
| JP | 2007503052 A | 2/2007 |
| JP | 2015197881 A | 11/2015 |
| JP | 2016122454 A | 7/2016 |
| WO | 2014061362 A1 | 4/2014 |

OTHER PUBLICATIONS

Notice of Reasons for Refusal for corresponding JP Application No. 2018-117876, 6 pages, dated Jul. 30, 2020.

\* cited by examiner

*Primary Examiner* — Pierre E Elisca
(74) *Attorney, Agent, or Firm* — Matthew B. Dernier, Esq.

(57) ABSTRACT

Disclosed herein is an input device including a first external surface, a second external surface facing in a direction different from the first external surface, a first operating pad disposed in the first external surface, and a second operating pad disposed in the second external surface. The first operating pad includes a touch sensor and is movable in response to a pressing operation. The second operating pad includes a touch sensor and is movable in response to a pressing operation.

12 Claims, 5 Drawing Sheets

INPUT DEVICE

BACKGROUND

The present disclosure relates to an input device.

PCT Patent Publication No. WO 2014/061362 below discloses an input device used for operation of a game device. This input device is provided with operating members such as operating buttons, direction keys, operating sticks, and the like.

SUMMARY

While a game is progressing (for example, while a game character is being operated), an operation (for example, a volume adjustment) not directly related to the progress of the game may become necessary. Such an operation is desired to be quickly performed in a short time. In addition, operations desired in the progress of games have recently been diversified.

It is desirable to propose an input device that can improve operability, and diversify operating inputs.

According to an embodiment of the present disclosure, there is provided an input device including a first external surface, a second external surface facing in a direction different from the first external surface, a first operating pad disposed in the first external surface, and a second operating pad disposed in the second external surface. The first operating pad includes a touch sensor and is movable in response to a pressing operation. The second operating pad also includes a touch sensor and is movable in response to a pressing operation. This input device can improve operability, and diversify operating inputs.

DETAILED DESCRIPTION OF PREFERRED EMBODIMENT

An embodiment of the present disclosure will hereinafter be described. In the following, an input device 1 depicted in FIG. 1 and the like will be described as an example of the embodiment. In the following description, directions indicated by Y1 and Y2 in FIG. 1 will be referred to as a frontward direction and a rearward direction, respectively, and directions indicated by Z1 and Z2 in FIG. 1 will be referred to as an upward direction and a downward direction, respectively. In addition, directions indicated by X1 and X2 depicted in FIG. 2 will be referred to as a right direction and a left direction, respectively.

General Outline

The input device 1 is used for operation of an electronic apparatus, for example, operation of a game device. The input device 1 is capable of communicating with the game device by wire or by radio. The input device 1 transmits a signal corresponding to an operation (button operation or the like) performed on the input device 1 to the game device. The game device controls a game on the basis of the signal received from the input device 1. A structure of the input device proposed in the embodiment of the present disclosure may be applied to an input device of an information processing device different from the game device.

Figure 1:
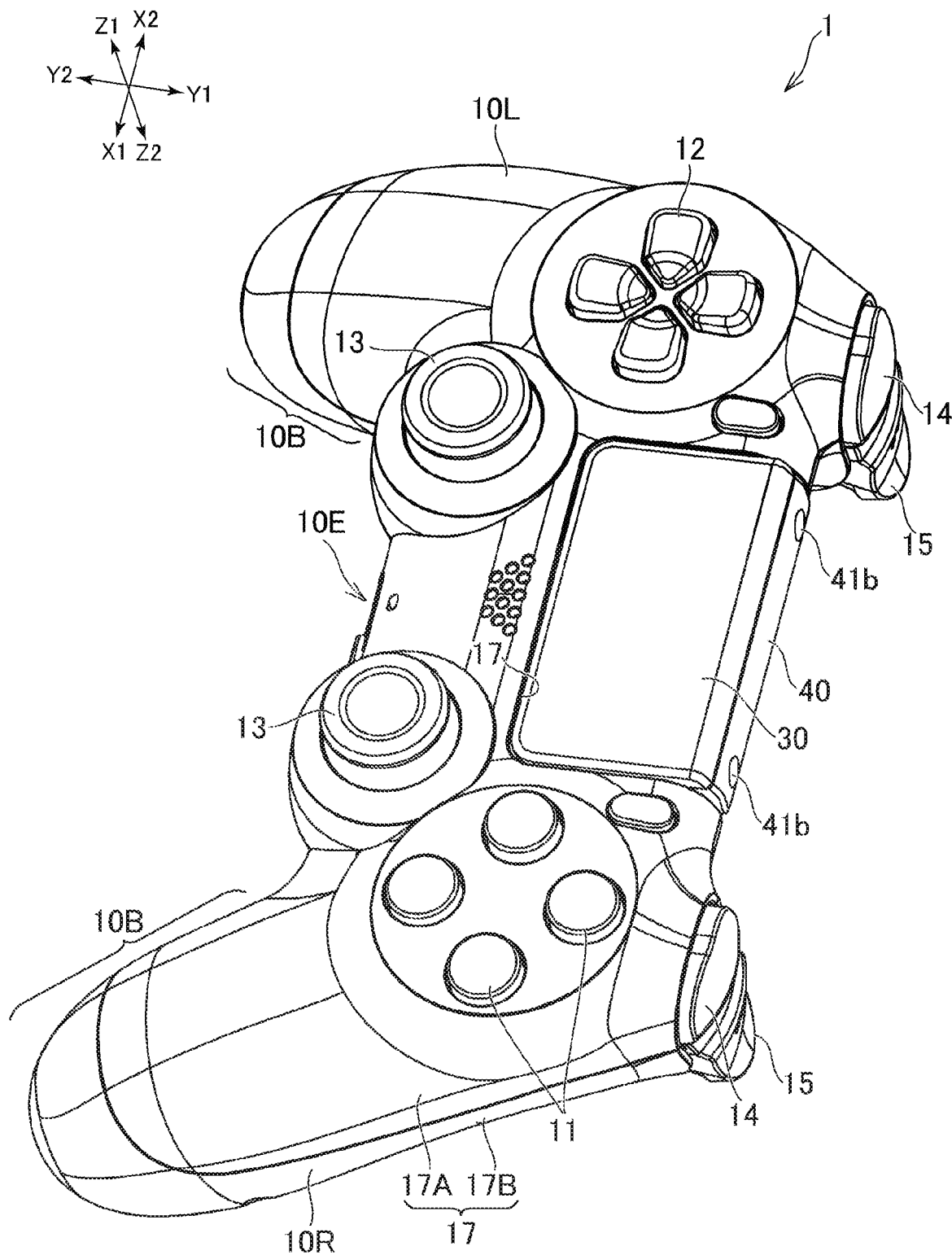
FIG. 1 is a perspective view depicting an example of an input device according to an embodiment of the present disclosure.
Figure 2:
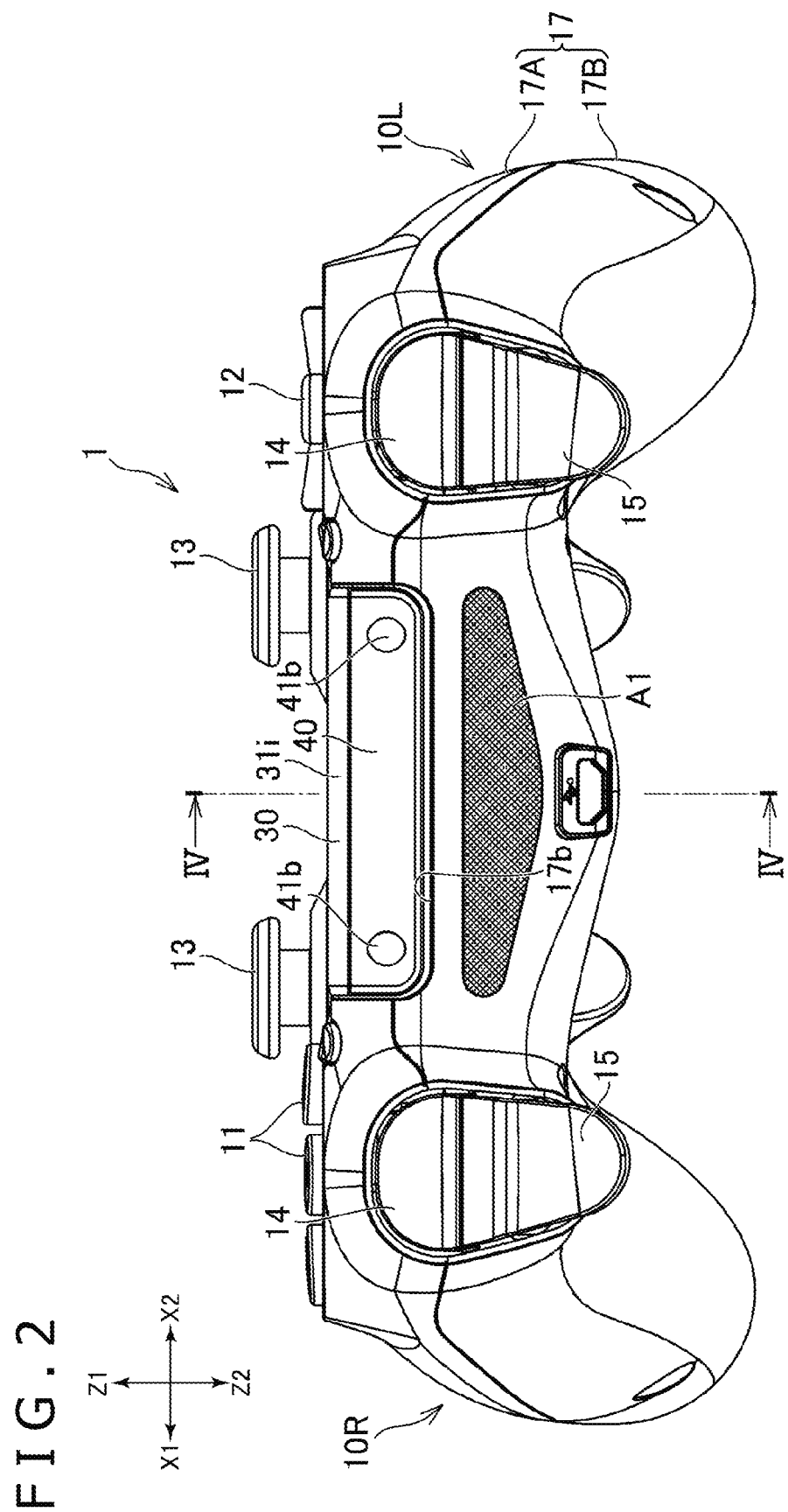
FIG. 2 is a front view of the input device depicted in FIG. 1.

As depicted in FIG. 1, the input device 1 has a right portion 10R and a left portion 10L. Operating members are arranged in a front side region of an upper surface of the right portion 10R and a front side region of an upper surface of the left portion 10L. Specifically, a plurality of operating buttons 11 are arranged in the upper surface of the right portion 10R. In addition, direction keys 12 are arranged in the upper surface of the left portion 10L. Each of the right portion 10R and the left portion 10L includes a grip portion 10B located in the rear of the region in which the operating members such as the operating buttons 11, the direction keys 12, or the like are arranged. Operating buttons 14 and 15 abreast of each other in an upward-downward direction are arranged in a front surface of the right portion 10R. Similarly, operating buttons 14 and 15 abreast of each other in the upward-downward direction are arranged in a front surface of the left portion 10L. The operating buttons 15 are arranged below the operating buttons 14. In addition, the input device 1 has operating sticks 13 between the right portion 10R and the left portion 10L. The operating sticks 13 are capable of an operation of tilting in a radial direction and a depressing operation. A kind and arrangement of the operating members possessed by the input device are not limited to those in the example of the input device 1.

As depicted in FIG. 1, the input device 1 has a housing 17 constituting an exterior of the input device 1. The plurality of operating members (the operating buttons 11, 14, and 15, the operating sticks 13, and the direction keys 12) described above are arranged in openings formed in the housing 17. A circuit board 52, a main body frame 51, and the like to be described later are arranged within the housing 17.

Operating Pads

As depicted in FIG. 1, the input device 1 has a first operating pad 30 as a plate-shaped operating member and a second operating pad 40 as a plate-shaped operating member. The operating pads 30 and 40 are respectively arranged in two external surfaces oriented in two directions different from each other. The two external surfaces are adjacent to each other. The operating pads 30 and 40 are arranged in parts where the two external surfaces adjoin each other. In the example of the input device 1, the first operating pad 30 and the second operating pad 40 are respectively arranged in an upper surface and a front surface of the input device 1, and are adjacent to each other. Specifically, the input device 1 has a central portion 10E between the right portion 10R and the left portion 10L, and the operating pads 30 and 40 are respectively arranged in an upper surface and a front surface of the central portion 10E. Hence, the operating pads 30 and 40 are located between the operating members on a right side (the operating buttons 11, 14, and 15 on the right side) and the operating members on a left side (the direction keys 12 and the operating buttons 14 and 15 on the left side). More specifically, the first operating pad 30 is located between the operating buttons 11 and the direction keys 12. The second operating pad 40 is located between the operating button 14 on the right side and the operating button 14 on the left side. A light emitting region A1 is formed in the front surface of the central portion 10E of the input device 1. The light emitting region A1 is lighted by a light emitting diode (LED) included in the input device 1. During the use of the input device 1, a user recognizes an object on a screen operated by the user himself/herself on the basis of a light emission color of the LED, or the game device tracks the light emitting region A1 through a camera and detects the position and attitude of the input device 1.

In addition, in the example of the input device 1, the operating pads 30 and 40 are located in front of the operating sticks 13. An opening corresponding to the size of the first operating pad 30 and the size of the second operating pad 40 is formed in the upper surface and the front surface of the housing 17. The first operating pad 30 and the second operating pad 40 are exposed from the opening, and constitute an external surface of the input device 1. The housing 17 includes an upper housing 17A and a lower housing 17B combined with each other in the upward-downward direction (see FIG. 1). The opening in which the operating pads 30 and 40 are arranged is formed in the two housings 17A and 17B. Specifically, a recessed portion 17a (see FIG. 1) is formed in a front edge of the upper housing 17A, and a recessed portion 17b (see FIG. 4) is formed in an upper edge of the lower housing 17B. The two recessed portions 17a and 17b are combined with each other to form one opening that exposes the operating pads 30 and 40.

The arrangement and number of the operating pads 30 and 40 are not limited to those in the example of the input device 1. For example, the second operating pad 40 may be disposed in a back surface of the input device 1 or a lower surface of the input device 1. The number of operating pads possessed by the input device may be larger than two.

Each of the operating pads 30 and 40 has a touch sensor. That is, the operating pads 30 and 40 have sensors for detecting the position of a finger of the user touching the surfaces of the operating pads 30 and 40. The operating pads 30 and 40 respectively have exterior plates 31 and 41 (see FIG. 3) constituting the surfaces of the operating pads 30 and 40. Circuit boards 32 and 42 (see FIG. 3) having the touch sensors formed thereon are arranged on the undersurfaces of the exterior plates 31 and 41. Usable as the touch sensors is, for example, a capacitive type sensor, an ultrasonic sensor, an optical sensor using infrared rays, for example, or the like. However, the kind of the touch sensors is not particularly limited. IC chips functioning as a driving circuit for the touch sensors may be mounted on the circuit boards 32 and 42.

In addition, each of the operating pads 30 and 40 is capable of pressing operation. That is, the operating pads 30 and 40 can move in response to a pressing operation of the user. The operating pads 30 and 40 are provided with switches that detect the movements of the operating pads 30 and 40. As will be described later, the first operating pad 30 can move in the upward-downward direction, and a switch 33 (see FIG. 4) for detecting a pressing operation of the first operating pad 30 is disposed below the first operating pad 30. The second operating pad 40 can move in a forward-rearward direction, and a switch 43 (see FIG. 4) for detecting a pressing operation of the second operating pad 40 is disposed in the rear of the second operating pad 40.

The first operating pad 30 is an operating member for operating application software executed in the game device. The second operating pad 40 is, for example, an operating member for operating system software that runs the game device. Here, the application software is specifically a program for performing particular processing, the program being a game program, a program for reproducing a moving image or music, or the like. The system software is a program for providing an environment for the application software to function, the program being an operating system or the like.

The use of such operating pads 30 and 40 can improve operability of the input device 1, and diversify operating inputs. For example, it is possible to operate a function provided by the system software by using the second operating pad 40 while operating the application software by the first operating pad 30. An operation of the application software by the first operating pad 30 is, for example, an operation of a game character. An operation of the system software by the second operating pad 40 is an operation not directly related to the progress of a game, and is, for example, an adjustment of a volume output from a speaker. The user can adjust the volume by sliding a finger on the surface of the second operating pad 40 while pressing the second operating pad 40, for example. Another example is display of a system screen. A message received from another user may be displayed on a screen or a menu screen may be displayed, for example, by performing a flick operation (operation of sliding a finger rapidly) on the surface of the second operating pad 40 while pressing the second operating pad 40.

It is to be noted that the usage mode of the operating pads 30 and 40 is not limited to that in the above-described example. Specifically, both the first operating pad 30 and the second operating pad 40 may be used to operate the system software that runs the game device. As another example, both the first operating pad 30 and the second operating pad 40 may be used to operate the application software executed in the game device. As yet another example, such a usage mode may be changed according to a state of the game device. For example, the usage mode during the execution of the application software may differ from the usage mode before the execution of the application software.

The first operating pad 30 is disposed in the upper surface of the input device 1. In many cases, the user moves a thumb or an index finger in the forward-rearward direction and the left-right direction on the first operating pad 30. At this time, the user can move the digit on the first operating pad 30 while looking at the first operating pad 30. The first operating pad 30 outputs a signal corresponding to the position of the digit in the left-right direction and the position of the digit in the forward-rearward direction. The game device performs processing corresponding to the position of the digit in the two directions when the first operating pad 30 is used.

The second operating pad 40 is disposed in the front surface of the input device 1. In many cases, the user moves an index finger or a middle finger in the left-right direction on the second operating pad 40 in a state in which it is difficult to view the second operating pad 40. In accordance with such a movement of the finger of the user, the second operating pad 40 has a shape elongate in the left-right direction. Specifically, a width in the upward-downward direction of the second operating pad 40 is smaller than half of a width in the left-right direction of the second operating pad 40. The touch sensor provided to the second operating pad 40 is configured to be able to detect the position of a finger in the upward-downward direction and the left-right direction. In an example, the game device performs processing according to the position of a finger of the user or a change in the position in the upward-downward direction and the left-right direction. In another example, the game device may perform processing according to the position of a finger of the user or a change in the position in the left-right direction without depending on the position of the finger in the upward-downward direction. In that case, the touch sensor provided to the second operating pad 40 may be configured to be able to detect only the position of the finger in the left-right direction.

Figure 4:
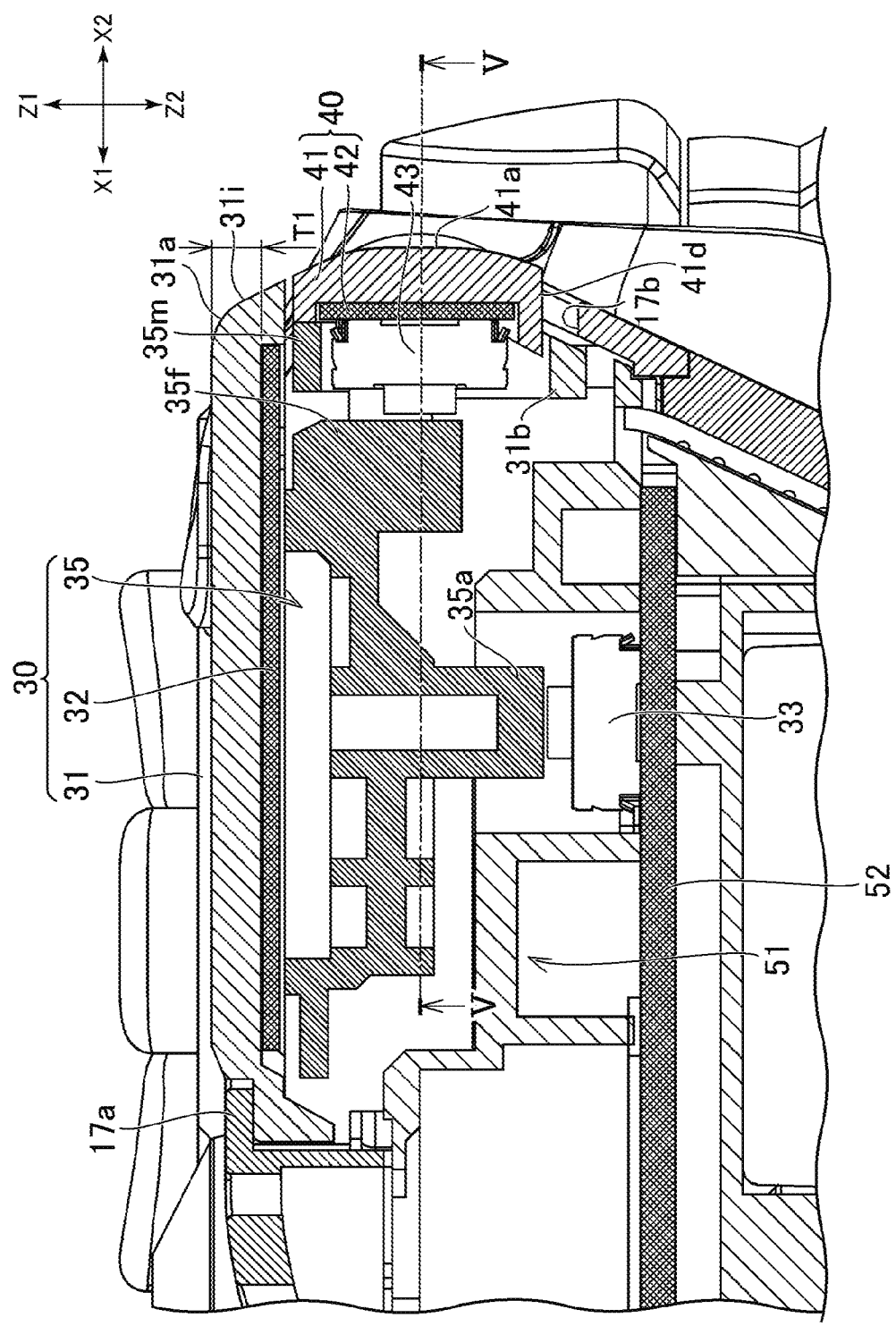
FIG. 4 is a sectional view taken along a line IV-IV depicted in FIG. 2.

Thus, a finger is moved in the forward-rearward direction and the left-right direction on the first operating pad 30, whereas a finger is moved only in the left-right direction on the second operating pad 40 in many cases. Therefore, as depicted in FIG. 4, the first operating pad 30 has a larger size than the second operating pad 40. Specifically, a width in the forward-rearward direction of the first operating pad 30 is larger than the width in the upward-downward direction of the second operating pad 40. For example, the width in the forward-rearward direction of the first operating pad 30 is larger than twice the width in the upward-downward direction of the second operating pad 40. The relation between the size of the first operating pad 30 and the size of the second operating pad 40 is not limited to that in the example of the input device 1. For example, the width in the upward-downward direction of the second operating pad 40 may be the same as the width in the forward-rearward direction of the first operating pad 30, or may be larger than the width in the forward-rearward direction of the first operating pad 30. Incidentally, in the input device 1, a width in the left-right direction of the first operating pad 30 is substantially the same as a width in the left-right direction of the second operating pad 40. Unlike the input device 1, the width in the left-right direction of the second operating pad 40 may be larger than the width in the left-right direction of the first operating pad 30, or may be smaller than the width in the left-right direction of the first operating pad 30.

Relative Position of Two Operating Pads

In the example of the input device 1, the first operating pad 30 is disposed in a frontmost portion of the upper surface of the input device 1, and a front edge 31a (see FIG. 4) of the first operating pad 30 constitutes a boundary (angular portion) between the upper surface and the front surface of the input device 1. In other words, the housing 17 does not have a portion located in front of the front edge 31a of the first operating pad 30. According to this disposition of the first operating pad 30, the sliding of a finger on the first operating pad 30 can be facilitated. For example, when the user slides a finger on the first operating pad 30 while pressing the first operating pad 30, the finger can avoid being caught by the housing 17 of the input device 1, for example. Incidentally, a gentle curve may be formed at the boundary between the front surface and the upper surface of the input device 1. In addition, the front edge 31a of the first operating pad 30 and an uppermost portion of the second operating pad 40 may be formed in conformity with the curve.

As described above, the first operating pad 30 can move in the upward-downward direction, and the user can depress the first operating pad 30. That is, the first operating pad 30 can be pressed downward as with the operating buttons 11 arranged on the right side of the first operating pad 30 and the direction keys 12 arranged on the left side of the first operating pad 30. As depicted in FIG. 4, the second operating pad 40 is located in the moving direction of the first operating pad 30 with respect to an edge portion of the first operating pad 30. That is, the second operating pad 40 is located below the front edge 31a of the first operating pad 30. As will be explained later in detail, the second operating pad 40 can move in the forward-rearward direction. That is, the second operating pad 40 can be pressed rearward as with the operating buttons 14 and 15 arranged on the right side of the second operating pad 40 and the operating buttons 14 and 15 arranged on the left side of the second operating pad 40.

The second operating pad 40 is adjacent to the front edge 31a of the first operating pad 30. That is, the front edge 31a of the first operating pad 30 and an upper edge of the second operating pad 40 are adjacent to each other, and only a slight gap is formed between the front edge 31a of the first operating pad 30 and the upper edge of the second operating pad 40, without any other member being disposed between the front edge 31a of the first operating pad 30 and the upper edge of the second operating pad 40. That is, the front edge 31a of the first operating pad 30 and the upper edge of the second operating pad 40 are continuous with each other. Therefore, the boundary (angular portion) between the upper surface and the front surface of the input device 1 is formed by one of or both the first operating pad 30 and the second operating pad 40. In the example of the input device 1, as described above, the front edge 31a of the first operating pad 30 forms the boundary (angular portion) between the upper surface and the front surface of the input device 1.

Because a distance between the front edge 31a of the first operating pad 30 and the upper edge of the second operating pad 40 is thus small, it is easy to provide the two operating pads 30 and 40 to the input device 1 without causing an increase in size of the input device 1. A gap between the front edge 31a of the first operating pad 30 and the upper edge of the second operating pad 40 is smaller than a thickness T1 of the first operating pad 30. More specifically, the gap between the front edge 31a of the first operating pad 30 and the upper edge of the second operating pad 40 is smaller than half of the thickness T1 of the first operating pad 30.

It is to be noted that the arrangement of the first operating pad 30 and the second operating pad 40 is not limited to that in the example of the input device 1. A part of the housing 17 may be located between the front edge of the first operating pad 30 and the upper edge of the second operating pad 40.

A front surface 41a (see FIG. 4) of the second operating pad 40 is curved so as to bulge forward, and this bulge extends in the left-right direction. This shape of the front surface 41a enables the user to avoid displacing the position of a finger from the second operating pad 40 in the upward-downward direction by moving the finger along the bulge. That is, the bulge of the front surface 41a functions as a guide that guides the user to the position of the second operating pad 40. Incidentally, the front surface 41a may be curved so as to be recessed, and the recess may extend in the left-right direction. In this case, the user can avoid displacing the position of a finger from the second operating pad 40 in the upward-downward direction by moving the finger along the recess. As yet another example, a rib-shaped projecting portion extending in the left-right direction or a plurality of projecting portions abreast of each other in the left-right direction may be formed as a guide on the front surface 41a.

In the example of the input device 1, the second operating pad 40 is partially located in front of the front edge 31a of the first operating pad 30. Specifically, the front surface 41a (see FIG. 4) of the second operating pad 40 is located in front of the front edge 31a of the first operating pad 30. As described above, the front surface 41a is curved so as to bulge forward. The front surface 41a is thereby located in front of the front edge 31a of the first operating pad 30.

According to this disposition of the second operating pad 40, the user can see the front surface 41a of the second operating pad 40 when viewing the input device 1 in plan.

As depicted in FIG. 4, the first operating pad 30 has an end surface 31i obliquely extending forward and downward. An uppermost portion of the curved front surface 41a of the second operating pad 40 obliquely extends forward and downward. The end surface 31i of the first operating pad 30 and the front surface 41a of the second operating pad 40 therefore constitute a continuous slope.

A projecting portion or a recessed portion may be formed on the front surface 41a of the second operating pad 40. For example, projecting portions or recessed portions located apart from each other in the left-right direction may be formed on the front surface 41a of the second operating pad 40. In the example of the input device 1, two projecting portions 41b (see FIG. 1) separated from each other in the left-right direction are formed on the front surface 41a of the second operating pad 40. The positions of the two projecting portions 41b are close to a right end and a left end of the second operating pad 40. The projecting portions 41b enable the user to recognize the size of the second operating pad 40 by touching the projecting portions 41b without viewing the second operating pad 40.

Structure that Retains Second Operating Pad

The second operating pad 40 is retained by the first operating pad 30. Hence, when the first operating pad 30 moves in the upward-downward direction due to a pressing operation of the first operating pad 30, the second operating pad 40 moves in the upward-downward direction together with the first operating pad 30. According to this structure, the first operating pad 30 and the second operating pad 40 do not interfere with each other when the first operating pad 30 is pressed. Thus, the distance (gap) between the first operating pad 30 and the second operating pad 40 can be made small, and pressing operations can be input to the two operating pads 30 and 40 at the same time.

The second operating pad 40 can move relative to the first operating pad 30. In the example of the input device 1, the second operating pad 40 can move in the forward-rearward direction relative to the first operating pad 30. This enables a pressing operation to be performed on the second operating pad 40. When the second operating pad 40 moves in the forward-rearward direction due to a pressing operation of the second operating pad 40, no change in position of the first operating pad 30 occurs.

Figure 3:
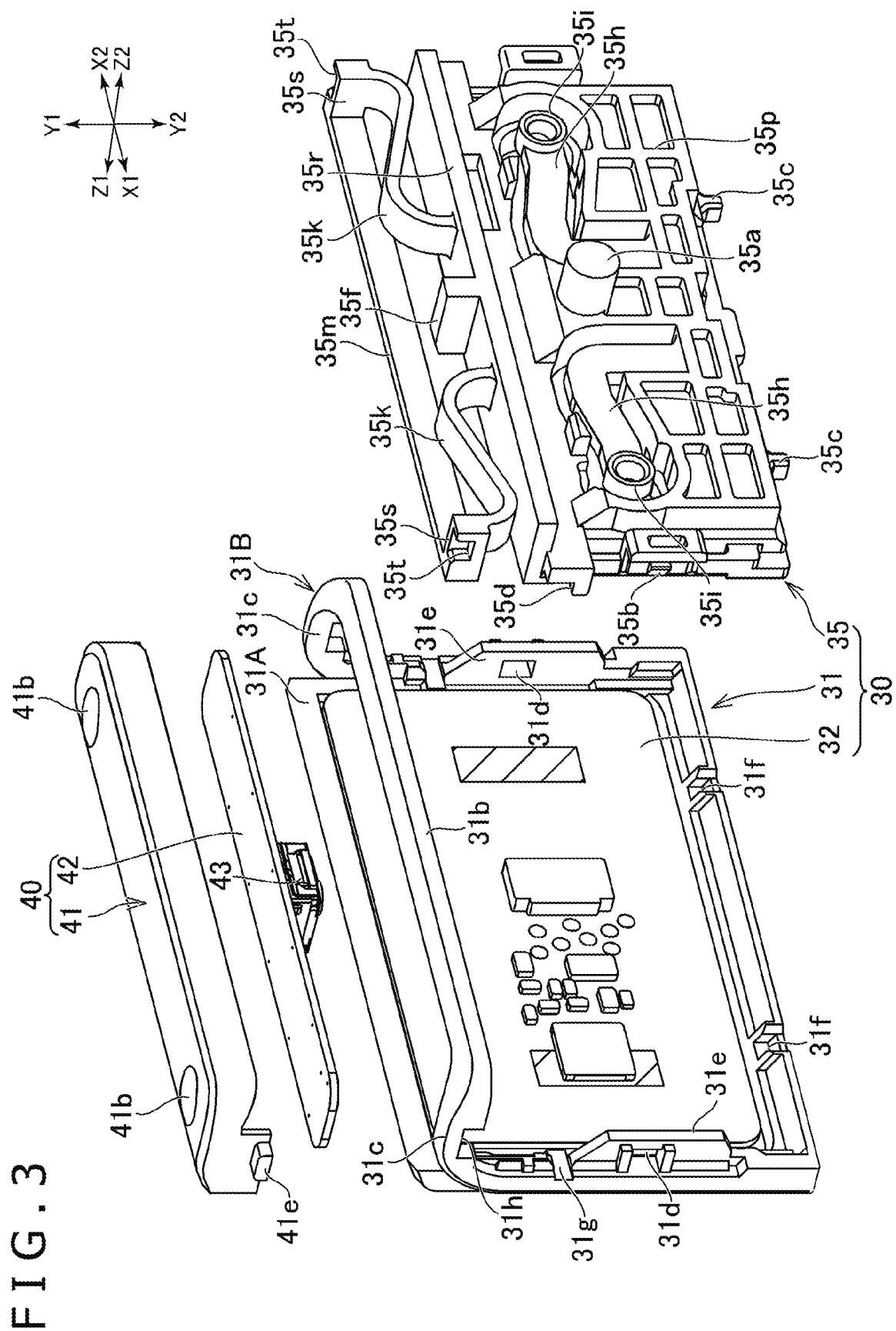
FIG. 3 is an exploded perspective view of a first operating pad and a second operating pad.

As depicted in FIG. 3, the first operating pad 30 has an exterior plate portion 31A (hereinafter referred to as a first exterior plate portion) constituting an exterior (upper surface) of the input device 1 and a holder portion 31B for retaining the second operating pad 40. In the example of the input device 1, the first operating pad 30 has a top plate 31, a circuit board 32, and a pad frame 35. The exterior plate portion 31A and the holder portion 31B are integrally formed as the top plate 31. An opening is formed in the holder portion 31B, and the second operating pad 40 is disposed inside the opening. That is, the holder portion 31B has side portions 31c arranged along a right edge and a left edge of the second operating pad 40 and a lower portion 31b disposed along a lower edge of the second operating pad 40.

The second operating pad 40 is disposed between the front edge 31a of the exterior plate portion 31A and the holder portion 31B. The position in the upward-downward direction and the left-right direction of the second operating pad 40 is regulated by the front edge 31a of the exterior plate portion 31A and the holder portion 31B. By this structure, the first operating pad 30 retains the second operating pad 40 such that the first operating pad 30 and the second operating pad 40 move together vertically while the first operating pad 30 allows movement of the second operating pad 40 in the forward-rearward direction.

In the example of the input device 1, the holder portion 31B extends downward from the exterior plate portion 31A. That is, the exterior plate portion 31A and the holder portion 31B are integrally formed of a resin. Unlike the example of the input device 1, the exterior plate portion 31A and the holder portion 31B may be formed separately from each other. In addition, the holder portion 31B may be attached to the exterior plate portion 31A or another member constituting the first operating pad 30 by a fastener such as a screw or the like.

As described above, the operating pads 30 and 40 are exposed from an opening formed in the housing 17. As depicted in FIG. 4, a gap is formed between a lower edge 41d of the second operating pad 40 and an edge (edge of a recessed portion formed in the lower housing 17B) 17b of the opening. This gap allows movement of the first operating pad 30 and the second operating pad 40 in the upward-downward direction. Incidentally, this gap is larger than the gap between the upper edge of the second operating pad 40 and the front edge 31a of the first operating pad 30. The lower portion 31b of the holder portion 31B is located in the rear of the gap between the lower edge 41d of the second operating pad 40 and the edge 17b of the opening. Due to the presence of the lower portion 31b, an internal structure of the input device 1 is not exposed from the gap.

The second operating pad 40 has an exterior plate portion 41 (hereinafter referred to as a second exterior plate portion 41) and a circuit board 42 (see FIG. 3). As will be described later, the second operating pad 40 is pushed forward by an elastic member (see reference numeral 35k in FIG. 3). That is, the second operating pad 40 is pushed toward an initial position thereof by the elastic member. Stopper-engaged portions 41e that restrict forward movement of the second operating pad 40 are formed on the second operating pad 40. As depicted in FIG. 3, in the example of the input device 1, the stopper-engaged portions 41e projecting sideward are formed at a right edge and a left edge of the second exterior plate portion 41. On the other hand, stopper portions 31h with which the stopper-engaged portions 41e are engaged are formed in the side portions 31c of the holder portion 31B of the first operating pad 30. In the example of the input device 1, the stopper portions 31h are recessed portions, and the stopper-engaged portions 41e are arranged inside the stopper portions 31h. In addition, the stopper-engaged portions 41e are guided in the forward-rearward direction by the stopper portions 31h.

Incidentally, the shape of the holder portion 31B is not limited to that in the example of the first operating pad 30 as long as the shape of the holder portion 31B can retain the second operating pad 40 while allowing movement of the second operating pad 40 in the forward-rearward direction. For example, the holder portion 31B may not have the lower portion 31b. In this case, the holder portion 31B may retain the second operating pad 40 by only the side portions 31c.

As yet another example, the holder portion may be formed on the second operating pad 40, and the first operating pad 30 may be retained by the holder portion. For example, a holder portion surrounding the periphery of the first operating pad 30 may be formed on the second operating pad 40. Also in this case, the two operating pads 30 and 40 move together downward when the first operating pad 30 is pressed, and the second operating pad 40 can move rearward with respect to the first operating pad 30 when the second operating pad 40 is pressed.

Switch and Pad Frame of First Operating Pad

As depicted in FIG. 4, the input device 1 has a main body frame 51 disposed below the first operating pad 30. Sensors (switches) that detect movement of operating members such as the operating buttons 11 and the direction keys 12 described above are arranged in the main body frame 51. Disposed below the main body frame 51 is a circuit board 52 mounted with a processor that controls the input device 1 and a communication module. In the example of the input device 1, the circuit board 52 is supported by the housing 17, and the main body frame 51 is retained on an upper side of the circuit board 52. The structure supporting the main body frame 51 and the circuit board 52 is not limited to that in the example of the input device 1. For example, the circuit board 52 may be attached to the main body frame 51.

As depicted in FIG. 4, a switch 33 is attached on the circuit board 52. The first operating pad 30 has a pressing portion 35a for pressing the switch 33. In the example of the input device 1, the first operating pad 30 has the pad frame 35 attached to an undersurface of the top plate 31, and the pressing portion 35a is formed on the pad frame 35. The pressing portion 35a is a projecting portion extending downward from the pad frame 35. On the other hand, the main body frame 51 has an opening inside which the switch 33 is disposed. The pressing portion 35a is located inside the opening, and is located above the switch 33. The circuit board 32 of the first operating pad 30 is disposed between the pad frame 35 and the exterior plate portion 31A.

As depicted in FIG. 3, the pad frame 35 has engaging portions (pawl portions) 35b at a right edge and a left edge of the pad frame 35. Positioning portions 31e and engaged portions 31d as holes formed in the positioning portions 31e are formed at a right edge and a left edge of the first operating pad 30 (more specifically the top plate 31). The pad frame 35 is disposed between the left and right positioning portions 31e, and the engaging portions 35b engage with the engaged portions 31d. In addition, engaging portions (projecting portions) 35c are formed at a rear edge of the pad frame 35, and stopper-engaged portions 35d are formed at the right edge and the left edge of the pad frame 35. Engaging portions (recessed portions) 31f to which the engaging portions 35c of the pad frame 35 are fitted are formed at a rear edge of the top plate 31. Engaging portions (recessed portions) 31g to which the stopper-engaged portions 35d of the pad frame 35 are fitted are formed at the right edge and the left edge of the top plate 31. The pad frame 35 is thereby attached to the exterior plate 31. Incidentally, a method of attaching the pad frame 35 and the top plate 31 to each other is not limited to that in the example of the input device 1. For example, the pad frame 35 and the top plate 31 may be fixed to each other by a screw, or may be bonded to each other.

The first operating pad 30 has high rigidity due to the presence of the pad frame 35. Therefore, a pressing operation of the first operating pad 30 can be detected properly through the switch 33. A rib 35p for increasing the rigidity of the pad frame 35 is formed on the pad frame 35.

Switch of Second Operating Pad

As depicted in FIG. 4, the circuit board 42 of the second operating pad 40 is attached to a back surface of the second exterior plate portion 41. For example, the circuit board 42 is bonded to the undersurface of the exterior plate portion 41. The circuit board 42 may be attached to the second exterior plate portion 41 by a fixture such as a screw or the like. The circuit board 42 may, for example, be a flexible printed circuit (FPC) connected to the circuit board 32, or may be a rigid board connected to the circuit board 32 via an FPC. As yet another example, the whole of the circuit board 32 and the circuit board 42 may be one FPC.

As depicted in FIG. 3, in the example of the input device 1, the switch 43 for detecting a pressing operation of the second operating pad 40 is mounted on the circuit board 42. A pressing portion 35f for pressing the switch 43 is formed in the first operating pad 30. Therefore, even when the first operating pad 30 is moved by a pressing operation of the first operating pad 30, the relative position of the switch 43 and the pressing portion 35f does not change. Hence, in a state in which the first operating pad 30 is pressed, the second operating pad 40 can be further pressed. As depicted in FIG. 3 and FIG. 4, in the example of the input device 1, the pressing portion 35f is formed on the pad frame 35. The pressing portion 35f is a projecting portion projecting forward from the pad frame 35. The disposition of the switch 43 is not limited to that in the example of the input device 1. For example, the switch 43 may be attached to the pad frame 35 (for example, a wall portion 35r on a front side). In this case, a pressing portion pressing the switch 43 may be formed on a part supported so as to be capable of forward and rearward movement by a left and a right spring portion 35k to be described later. For example, a pressing portion for pressing the switch 43 attached to the wall portion 35r may be formed on a coupling portion 35m extending in the left-right direction and coupling the left and right spring portions 35k to each other. As yet another example, the pressing portion may be formed on the second exterior plate portion 41 itself rather than on the coupling portion 35m.

Elastic Support of Operating Pad

The input device 1 has an elastic member that pushes the first operating pad 30 toward an initial position. That is, the input device 1 has an elastic member that pushes the first operating pad 30 upward. As depicted in FIG. 3, in the example of the input device 1, spring portions 35h in the shape of a leaf spring are formed in the pad frame 35. The spring portions 35h are formed integrally with the pad frame 35. The spring portions 35h are located on the right side and the left side of the pressing portion 35a. End portions 35i of the spring portions 35h abut against the main body frame 51, and the spring portions 35h push the first operating pad 30 upward. The structure for pushing the first operating pad 30 is not limited to that in the example of the input device 1. For example, the input device 1 may have an elastic member (such as a rubber, a leaf spring, a coil spring, or the like) separate from the pad frame 35.

As described above, the operating pads 30 and 40 are exposed from an opening formed in the housing 17. An edge of the operating pad 30 (specifically the first exterior plate portion 31A) is located on a lower side of an edge (edge of the recessed portion formed in the upper housing 17A) 17a (see FIG. 4) of the opening formed in the housing 17. Upward movement of the first operating pad 30 is thereby regulated. In addition, the edge 17a of the opening of the housing 17 has a stopper engaging with the edge (for example, the right edge and the left edge) of the operating pad 30 (specifically the first exterior plate portion 31A), and forward movement of the first operating pad 30 is regulated by the action of the stopper.

The input device 1 has an elastic member that pushes the second operating pad 40 toward an initial position. Specifically, the input device 1 has an elastic member that pushes the second operating pad 40 forward. In the example of the input device 1, the elastic member that pushes the second operating pad 40 is provided to the first operating pad 30. Because of this, even when the first operating pad 30 is pressed, the relative position of the second operating pad 40 and the elastic member does not change, and the second operating pad 40 can be pushed toward the initial position.

Figure 5:
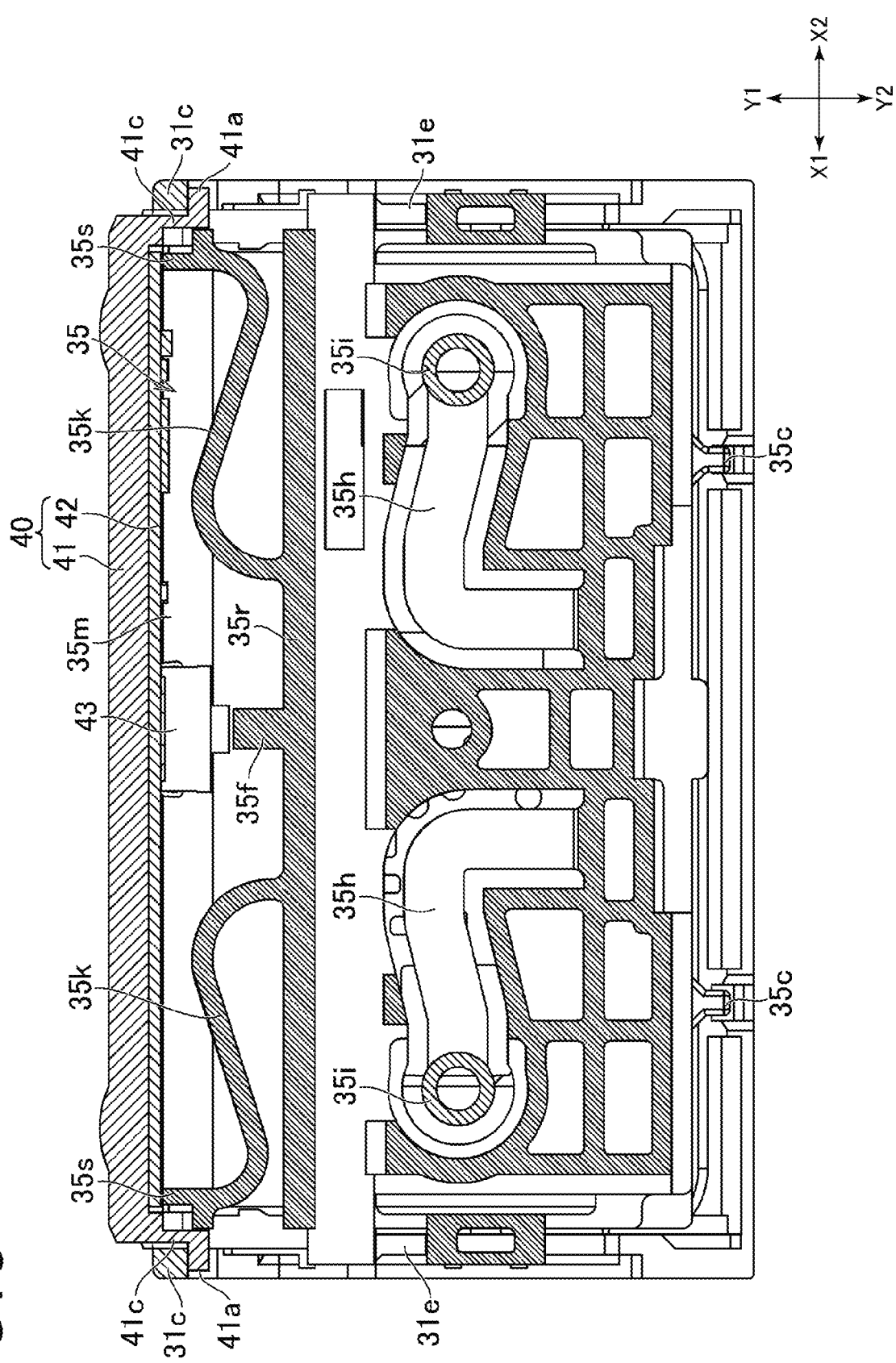
FIG. 5 is a sectional view taken along a line V-V depicted in FIG. 4.

As depicted in FIG. 3, in the example of the input device 1, the spring portions 35k elastically deformable in the forward-rearward direction are formed on the pad frame 35. The spring portions 35k are formed on a right portion and a left portion of the pad frame 35. End portions 35s of the left and right spring portions 35k are coupled to each other by a coupling portion 35m. A front edge of the coupling portion 35m abuts against the undersurface of the second exterior plate portion 41 (see FIG. 5). Therefore, a force that pushes the second operating pad 40 forward acts on an entire region in the left-right direction of the second operating pad 40. As depicted in FIG. 5, the second exterior plate portion 41 has side wall portions 41c at the right edge and the left edge of the second exterior plate portion 41, the side wall portions 41c extending rearward. The end portions 35s of the spring portions 35k also abut against inner surfaces of the side wall portions 41c. Because of this, the spring portions 35k also optimize the relative position of the first operating pad 30 and the second operating pad 40 in the left-right direction.

The pad frame 35 has the wall portion 35r in the front of the pad frame 35. The spring portions 35k extend from the front side of the wall portion 35r. In the example of the input device 1, the shape of the spring portion 35k is substantially the shape of an S. However, the shape of the spring portion 35k is not limited to this. In addition, the spring portions 35k may be formed separately from the pad frame 35. In this case, the spring portions 35k may be attached to the pad frame 35, or may be attached to the second operating pad 40.

As depicted in FIG. 3, positioning portions 35t for regulating the relative position of the spring portion 35k and the second operating pad 40 may be formed in the end portions 35s of the spring portions 35k. In the example of the input device 1, the positioning portions 35t are recessed portions, and projecting portions to be fitted into the recessed portions 35t may be formed on the second exterior plate portion 41.

As described above, the stopper-engaged portions 41e are formed at the right edge and the left edge of the second exterior plate portion 41. The stopper portions 31h are formed in the side portions 31c of the holder portion 31B. As depicted in FIG. 3, the switch 43 for detecting movement of the second operating pad 40 is located in a central portion in the left-right direction. When the right end of the second operating pad 40 is pressed, for example, forward movement of the stopper-engaged portion 41e on the left side is regulated by the stopper portion 31h, and therefore the second operating pad 40 can press the switch 43. Conversely, when the left end of the second operating pad 40 is pressed, forward movement of the stopper-engaged portion 41e on the right side is regulated by the stopper portion 31h, and therefore the second operating pad 40 can press the switch 43. That is, though the second operating pad 40 is elongate in the left-right direction, the user can input a pressing operation by pressing any position of the second operating pad 40.

SUMMARY

As described above, the input device 1 has the first operating pad 30 disposed in the upper surface and the second operating pad 40 disposed in the front surface. The first operating pad 30 includes a touch sensor, and is movable in the upward-downward direction in response to a pressing operation. The second operating pad 40 also includes a touch sensor, and is movable in response to a pressing operation. The input device 1 can improve operability, and diversify operating inputs.

Modifications

The input device proposed in the present disclosure is not limited to the input device 1 described above.

For example, the second operating pad 40 may be disposed in the rear surface of the input device 1. For example, the input device 1 may have the first operating pad 30 in the upper surface, and have the second operating pad 40 in the rear surface. Also in this case, the first operating pad 30 may retain the second operating pad 40 such that the first operating pad 30 and the second operating pad 40 move together vertically while the first operating pad 30 allows movement in the forward-rearward direction of the second operating pad 40.

In yet another example, a member partitioning the first operating pad 30 and the second operating pad 40 may be disposed between the first operating pad 30 and the second operating pad 40. The member partitioning the first operating pad 30 and the second operating pad 40 may be capable of moving vertically integrally with the first operating pad 30.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2018-117876 filed in the Japan Patent Office on Jun. 21, 2018, the entire content of which is hereby incorporated by reference.

What is claimed is:

1. An input device comprising:
   a first external surface;
   a second external surface facing in a direction different from the first external surface;
   a first operating pad disposed in the first external surface; and
   a second operating pad disposed in the second external surface;
   the first operating pad including a touch sensor, and being movable in response to a pressing operation;
   the second operating pad including a touch sensor, and being movable in response to a pressing operation.

2. The input device according to claim 1, wherein the second operating pad is adjacent to an edge portion of the first operating pad.

3. The input device according to claim 1, wherein the first operating pad constitutes a boundary between the first external surface and the second external surface.

4. The input device according to claim 1, wherein the first operating pad is movable in a first direction in response to the pressing operation, and the second operating pad is adjacent to the first operating pad in the first direction.

5. The input device according to claim 1, wherein
the second operating pad is disposed below a front edge portion of the first operating pad, and
the second operating pad has a part located in front of the front edge portion of the first operating pad as viewed in plan of the first operating pad.

6. The input device according to claim 1, wherein
the second operating pad is movable in a first direction together with the first operating pad when the first operating pad receives the pressing operation.

7. The input device according to claim 6, wherein
the first operating pad retains the second operating pad, and allows movement of the second operating pad due to the pressing operation of the second operating pad.

8. The input device according to claim 1, further comprising:
an elastic member configured to push the second operating pad toward an initial position of the second operating pad,
wherein the elastic member is supported by the first operating pad.

9. The input device according to claim 1, further comprising:
a switch configured to detect movement of the second operating pad, and
a pressing portion configured to press the switch as a result of an operation of the second operating pad;
wherein one of the first operating pad and the second operating pad has one of the switch and the pressing portion, and
the other of the first operating pad and the second operating pad has the other of the switch and the pressing portion.

10. The input device according to claim 1, wherein
the second operating pad has a first part and a second part located on opposite sides from each other with a switch interposed between the first part and the second part, and
the input device has a first stopper configured to regulate movement of the second part in an opposite direction from a first direction when the first part is moved in the first direction and a second stopper configured to regulate movement of the first part in the opposite direction from the first direction when the second part is moved in the first direction.

11. The input device according to claim 1, wherein
the first external surface is an upper surface of the input device, and
the second external surface is a front surface or a rear surface of the input device.

12. The input device according to claim 1, further comprising:
an operating member disposed on a right portion of the input device; and
an operating member disposed on a left portion of the input device,
wherein the first operating pad and the second operating pad are located between the operating member disposed on the right portion of the input device and the operating member disposed on the left portion of the input device.

* * * * *